United States Patent [19]
Asghar et al.

[11] Patent Number: 5,790,824
[45] Date of Patent: Aug. 4, 1998

[54] CENTRAL PROCESSING UNIT INCLUDING A DSP FUNCTION PREPROCESSOR WHICH SCANS INSTRUCTION SEQUENCES FOR DSP FUNCTIONS

[75] Inventors: Saf Asghar; Mark Ireton; John Bartkowiak, all of Austin, Tex.

[73] Assignee: Advanced Micro Devices, Inc., Sunnyvale, Calif.

[21] Appl. No.: 618,240

[22] Filed: Mar. 18, 1996

[51] Int. Cl.$^6$ .................................................. G06F 9/318
[52] U.S. Cl. ...................... 395/385; 395/389; 395/800.35
[58] Field of Search .......................... 395/200.4, 384, 395/389, 500, 586, 596, 567, 385, 800.35

[56] References Cited

U.S. PATENT DOCUMENTS

| | | | |
|---|---|---|---|
| 4,439,828 | 3/1984 | Martin | 395/567 |
| 4,638,423 | 1/1987 | Ballard | 395/500 |
| 5,355,485 | 10/1994 | Denio et al. | 395/200.43 |
| 5,568,646 | 10/1996 | Jaggar | 395/385 |
| 5,588,118 | 12/1996 | Mandava et al. | 395/200.04 |
| 5,619,665 | 4/1997 | Emma | 395/384 |
| 5,630,082 | 5/1997 | Yao et al. | 395/389 |
| 5,638,525 | 6/1997 | Hammond et al. | 395/385 |

FOREIGN PATENT DOCUMENTS

| | | |
|---|---|---|
| 0 071 028 A2 | 2/1983 | European Pat. Off. |
| 0 442 041 A2 | 8/1991 | European Pat. Off. |
| 0 465 054 A1 | 1/1992 | European Pat. Off. |
| 0 478 904 A2 | 4/1992 | European Pat. Off. |
| 0465054 | 4/1996 | European Pat. Off. |

OTHER PUBLICATIONS

IBM Technical Disclosure Bulletin, Real–Time CISC Architecture HW Emulator on a RISC Processor, vol. 37, No. 3, Mar. 1994.

(List continued on next page.)

*Primary Examiner*—Parshotam S. Lall
*Assistant Examiner*—Patrice L. Winder
*Attorney, Agent, or Firm*—Conley, Rose & Tayon; Jeffrey C. Hood

[57] ABSTRACT

A CPU or microprocessor which includes a general purpose CPU component, such as an X86 core, an also includes a DSP core. The CPU also includes an intelligent DSP function decoder or preprocessor which examines X86 opcode sequences and determines if a DSP function is being executed. If the DSP function decoder determines that a DSP function is being executed, the DSP function decoder converts or maps the opcodes to a DSP macro instruction that is provided to the DSP core. The DSP core executes one or more DSP instructions to implement the desired DSP function in response to the macro instruction. The DSP core implements or performs the DSP function using a lesser number of instructions and also in reduced number of clock cycles, thus increasing system performance. If the X86 opcodes in the instruction cache or instruction memory do not indicate or are not intended to perform a DSP-type function, the opcodes are provided to the X86 core as which occurs in current prior art computer systems. The X86 core and the DSP core are coupled to each other and communicate data and timing signals for synchronization purposes. Thus, the DSP core offloads these mathematical functions from the X86 core, thereby increasing system performance. The DSP core also operates in parallel with the X86 core, providing further performance benefits. The CPU of the present invention thus implements DSP functions more efficiently than X86 logic while requiring no additional X86 opcodes. The present invention also generates code that operates transparently on an X86 only CPU or a CPU according to the present invention which includes X86 and DSP cores. Thus the present invention is backwards compatible with existing software.

17 Claims, 11 Drawing Sheets

OTHER PUBLICATIONS

Andrew S. Tanenbaum, Structured Computer Organization, 1.4 Hardware, Software, and Multilevel Machines, pp. 10–12, Dec. 1984.

Flanagan, William. P., Tangent and NexGen team up to challenge Intel., PC Magazine, pp. 37–39, Nov. 1994.

Mahon et al., Hewlett–Packard Precision Architecture: The Processor, Hewlett Packard Journal, pp. 4–22, Aug. 1986.

Seltzer, Larry J., Four ways to fake an X86 . . . . PC Week, pp. 93–94, Nov. 1994.

Halfhill, T.R., "AMD K6 Takes on Intel P6," BYTE, vol. 21, No. 1 Jan. 1, 1996, pp. 67,68, 70 & 72.

International Search Report for PCT/US 96/19584, dated Dec. 30, 1997.

International Search Report for PCT/US 96/19586 dated Apr. 28, 1997.

CENTRAL PROCESSING UNIT INCLUDING A DSP FUNCTION PREPROCESSOR WHICH SCANS INSTRUCTION SEQUENCES FOR DSP FUNCTIONS

CROSS REFERENCE TO RELATED APPLICATIONS

The following applications are related to the present application and are hereby incorporated by reference in their entirety.

U.S. patent application Ser. No. 08/618,243, titled "Central Processing Unit Having an X86 and DSP Core and Including a DSP Function Decoder which Maps X86 Instructions to DSP Instructions" and filed Mar. 18, 1996 , and which is assigned to Advanced Micro Devices Corp.

U.S. patent application Ser. No. 08/618,000, titled "Central Processing Unit Having X86 and DSP Functional Units" and filed Mar. 18, 1996, and which is assigned to Advanced Micro Devices Corp.

U.S. patent application Ser. No. 08/618,242, titled "Central Processing Unit Including a DSP Function Preprocessor Having a Pattern Recognition Detector for Detecting Instruction Sequences which Perform DSP Functions" and filed Mar. 18, 1996, and which is assigned to Advanced Micro Devices Corp.

U.S. patent application Ser. No. 08/618,241, titled "Central Processing Unit Including a DSP Function Preprocessor Having a Look-up Table Apparatus for Detecting Instruction Sequences which Perform DSP Functions" and filed Mar. 18, 1996, and which is assigned to Advanced Micro Devices Corp.

FIELD OF THE INVENTION

The present invention relates to a computer system CPU or microprocessor which includes a general purpose core and a DSP core, wherein the CPU includes a DSP function decoder which detects general purpose opcode sequences intended to perform DSP-type functions and converts these opcodes into corresponding DSP macros for execution by the DSP core.

DESCRIPTION OF THE RELATED ART

Personal computer systems and general purpose microprocessors were originally developed for business applications such as word processing and spreadsheets, among others. However, computer systems are currently being used to handle a number of real time DSP-related applications, including multimedia applications having video and audio components, video capture and playback, telephony applications, speech recognition and synthesis, and communication applications, among others. These real time or DSP-like applications typically require increased CPU floating point performance.

One problem that has arisen is that general purpose microprocessors originally designed for business applications are not well suited for the real-time requirements and mathematical computation requirements of modern DSP-related applications, such as multimedia applications and communications applications. For example, the X86 family of microprocessors from Intel Corporation are oriented toward integer-based calculations and memory management operations and do not perform DSP-type functions very well.

As personal computer systems have evolved toward more real-time and multimedia capable systems, the general purpose CPU has been correspondingly required to perform more mathematically intensive DSP-type functions. Therefore, many computer systems now include one or more digital signal processors which are dedicated towards these complex mathematical functions.

A recent trend in computer system architectures is the movement toward "native signal processing (NSP)". Native signal processing or NSP was originally introduced by Intel Corporation as a strategy to offload certain functions from DSPs and perform these functions within the main or general purpose CPU. The strategy presumes that, as performance and clock speeds of general purpose CPUs increase, the general purpose CPU is able to perform many of the functions formerly performed by dedicated DSPs. Thus, one trend in the microprocessor industry is an effort to provide CPU designs with higher speeds and augmented with DSP-type capabilities, such as more powerful floating point units. Another trend in the industry is for DSP manufacturers to provide DSPs that not only run at high speeds but also can emulate CPU-type capabilities such as memory management functions.

A digital signal processor is essentially a general purpose microprocessor which includes special hardware for executing mathematical functions at speeds and efficiencies not usually associated with microprocessors. In current computer system architectures, DSPs are used as co-processors and operate in conjunction with general purpose CPUs within the system. For example, current computer systems may include a general purpose CPU as the main CPU and include one or more multimedia or communication expansion cards which include dedicated DSPs. The CPU offloads mathematical functions to the digital signal processor, thus increasing system efficiency.

Digital signal processors include execution units that comprise one or more arithmetic logic units (ALUs) coupled to hardware multipliers which implement complex mathematical algorithms in a pipelined manner. The instruction set primarily comprises DSP-type instructions and also includes a small number of instructions having non-DSP functionality.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily Boolean/decision operations (or general data processing).

A general purpose CPU is comprised of an execution unit, a memory management unit, and a floating point unit, as well as other logic. The task of a general purpose CPU is to execute code and perform operations on data in the computer memory and thus to manage the computing platform. In general, the general purpose CPU architecture is designed primarily to perform Boolean/management/data manipulation decision operations. The instructions or opcodes executed by a general-purpose CPU include basic mathematical functions. However these mathematical functions are not well adapted to complex DSP-type mathematical operations. Thus a general purpose CPU is required to execute a large number of opcodes or instructions to perform basic DSP functions.

Therefore, a computer system and CPU architecture is desired which includes a general purpose CPU and which also performs DSP-type mathematical functions with increased performance. A CPU architecture is also desired which is backwards compatible with existing software applications which presume that the general purpose CPU is performing all of the mathematical computations. A new CPU architecture is further desired which provides increased mathematical performance for existing software applications.

One popular microprocessor used in personal computer systems is the X86 family of microprocessors. The X86 family of microprocessors includes the 8088, 8086, 80186, 80286, 80386, i486, Pentium, and P6 microprocessors from Intel Corporation. The X86 family of microprocessors also includes X86 compatible processors such as the 4486 and K5 processors from Advanced Micro Devices, the M1 processor from Cyrix Corporation, and the NextGen 5x86 and 6x86 processors from NextGen Corporation. The X86 family of microprocessors was primarily designed and developed for business applications. In general, the instruction set of the X86 family of microprocessors does not include sufficient mathematical or DSP functionality for modern multimedia and communications applications. Therefore, a new X86 CPU architecture is further desired which implements DSP functions more efficiently than current X86 processors, but also requires no additional opcodes for the X86 processor.

SUMMARY OF THE INVENTION

The present invention comprises a CPU or microprocessor which includes a general purpose CPU component, such as an X86 core, and also includes a DSP core. The CPU includes an intelligent DSP function decoder or preprocessor which examines sequences of instructions or opcodes (X86 opcodes) and determines if a DSP function is being executed. If the DSP function decoder determines that a DSP function is being executed, the DSP function decoder converts or maps the instruction sequence to a DSP macro instruction or function identifier that is provided to the DSP core. The DSP core executes one or more DSP instructions to implement the desired DSP function indicated by the DSP macro or function identifier. The DSP core performs the DSP function in parallel with other operations performed by the general purpose CPU core. The DSP core also performs the DSP function using a lesser number of instructions and also in a reduced number of clock cycles, thus increasing system performance.

In the preferred embodiment, the CPU of the present invention includes an instruction memory or instruction cache which receives microprocessor instructions or opcodes from the system memory and stores these opcodes for use by the CPU. The CPU also includes a DSP function decoder or preprocessor, also referred to as an instruction sequence preprocessor, which analyzes instruction sequences in the instruction cache and intelligently determines when a DSP-type function is implemented by or represented by the instruction sequence. The function preprocessor scans ahead for instruction sequences in the instruction cache that implement DSP functions.

In one embodiment, the function preprocessor includes a pattern recognition detector which stores a plurality of bit patterns indicative of instruction sequences which implement DSP functions. The pattern recognition detector compares each pattern with an instruction sequence and determines if one of the patterns substantially matches the instruction sequence. In one embodiment, a substantial match occurs when a pattern matches the instruction sequence by greater than 90%. In another embodiment, the function preprocessor includes a look-up table which stores a plurality of bit pattern entries indicative of instruction sequences which implement DSP functions. The function preprocessor compares each pattern entry with an instruction sequence and determines if one of the entries exactly matches the instruction sequence. Other embodiments include a two stage determination of a look-up table and a pattern recognition detector.

In the preferred embodiment, the function preprocessor detects X86 instruction sequences which are intended to perform DSP-type functions such as convolution, correlation, Fast Fourier Transforms (FFTs), finite impulse response (FIR) filters, infinite impulse response (IIR) filters, inner products and matrix manipulation operations.

If the instructions in the instruction cache or instruction memory do not implement a DSP-type function, the instructions are provided to the general purpose or X86 core, or to one or more X86 execution units, as which occurs in current prior art computer systems. Thus the X86 core executes general purpose X86 instructions which do not represent DSP functions.

When the function preprocessor detects a sequence of X86 instructions which implement a DSP function, i.e., are intended to perform a DSP-type function, the function preprocessor decodes the sequence of X86 instructions and generates a single macro or function identifier which represents the function indicated by the sequence of X86 instructions. The function preprocessor also examines information in the X86 instruction sequence and generates zero or more parameters which indicate the data values being used for the DSP-type operation. The function preprocessor then provides the function identifier and the various necessary parameters to the DSP core, or to one or more DSP execution units.

The DSP core receives the macro or function identifier and the respective parameters and uses the macro to index into a DSP microcode sequence which implements the indicated DSP function. The DSP core also uses the respective parameters in executing the DSP function. Since the DSP core is optimized for these DSP-type mathematical operations, the DSP core can generally execute the desired function in a reduced number of instructions and clock cycles.

The DSP core executes in parallel with the general purpose CPU core. Thus X86 (non-DSP) opcodes are potentially executed by the general purpose CPU core or X86 core in parallel with DSP functions, assuming there is data independence. The general purpose core and the DSP core are coupled to each other and communicate data and timing signals for synchronization purposes. In one embodiment, a cache or buffer is comprised between the general purpose core and the DSP core for the transfer of information between the two units.

Thus, the general purpose CPU portion executes X86 instructions as in prior systems. However, for those instruction sequences which are intended to perform DSP-type functions, the function preprocessor intelligently detects these sequences and provides a corresponding macro and parameters to the DSP core. Thus, the DSP core offloads these mathematical functions from the general purpose core, thereby increasing system performance. The DSP core also operates in parallel with the general purpose core, providing further performance benefits.

Therefore the present invention comprises a general purpose CPU including a DSP core which performs DSP operations. The CPU includes an intelligent DSP function decoder or preprocessor which examines instruction sequences and converts or maps sequences which perform DSP functions to a DSP macro instruction for execution by the DSP core. The DSP core uses the DSP macro instruction to implement the desired DSP function. The DSP core implements or performs the DSP function in a lesser number of instructions and also in a reduced number of clock cycles, thus increasing system performance. The CPU of the present invention thus implements DSP functions more efficiently than X86 logic while requiring no additional X86 opcodes. The CPU of the present invention also executes code that operates on an X86-only CPU, thus providing backwards compatibility with existing software. Further, code written for the CPU of the present invention also operates properly on an X86-only CPU.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

*Pentium System Architecture* by Don Anderson and Tom Shanley and available from Mindshare Press, 2202 Buttercup Dr., Richardson, Tex. 75082 (214) 231-2216, is hereby incorporated by reference in its entirety.

*Digital Signal Processing Applications Using the ADSP-2100 Family* Volumes 1 and 2, 1995 edition, available from Analog Devices Corporation of Norwood Mass., is hereby incorporated by reference in its entirety.

The Intel CPU Handbook, 1994 and 1995 editions, available from Intel Corporation, are hereby incorporated by reference in their entirety.

The AMD K5 Handbook, 1995 edition, available from Advanced Micro Devices Corporation, is hereby incorporated by reference in its entirety.

Computer System Block Diagram

Figure 1:
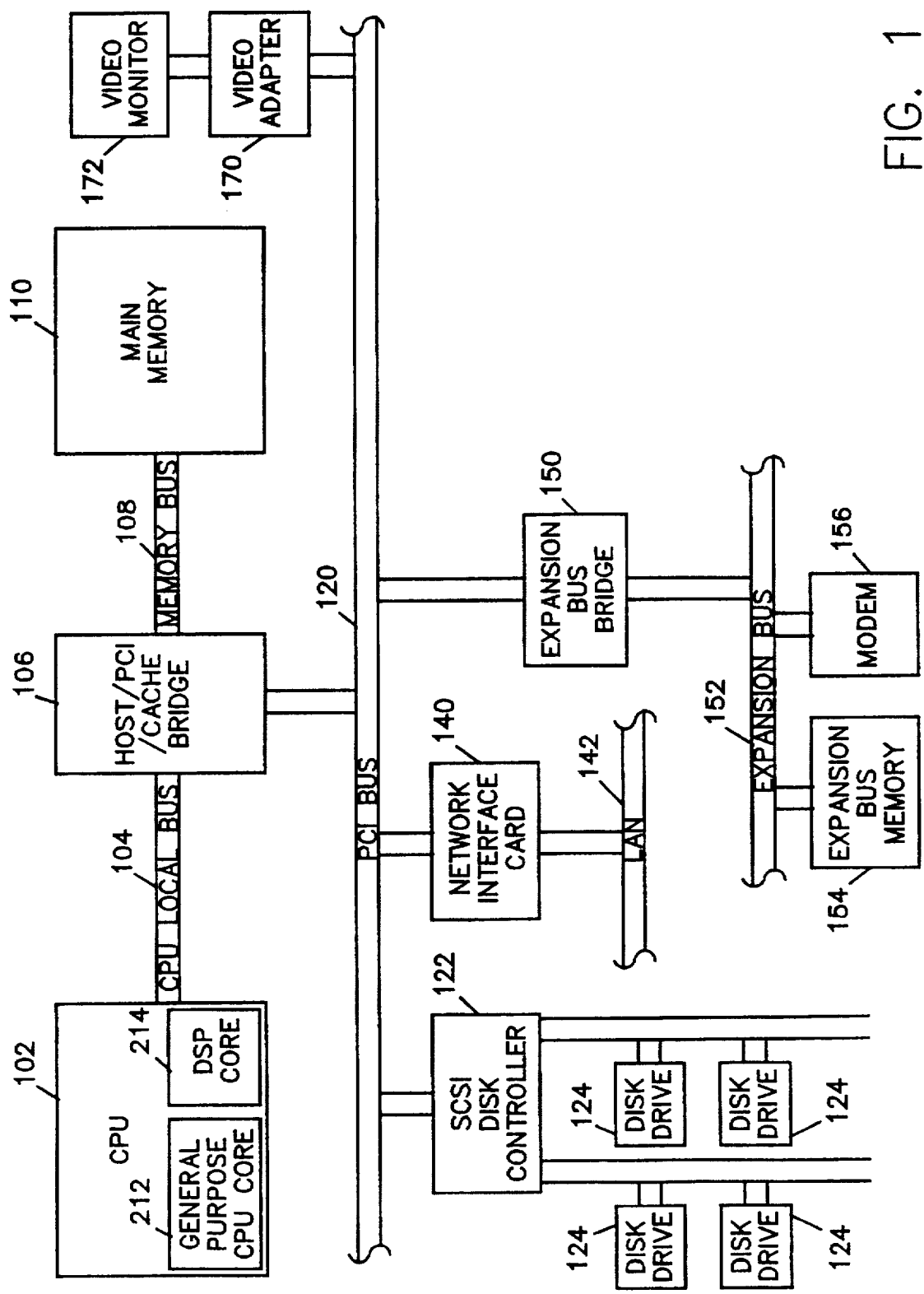
FIG. 1 is a block diagram of a computer system including a CPU having a general purpose CPU core and a DSP core according to the present invention

Referring now to FIG. 1, a block diagram of a computer system incorporating a central processing unit (CPU) or microprocessor 102 according to the present invention is shown. The computer system shown in FIG. 1 is illustrative only, and the CPU 102 of the present invention may be incorporated into any of various types of computer systems.

As shown, the CPU 102 includes a general purpose CPU core 212 and a DSP core 214. The general purpose core 212 executes general purpose (non-DSP) opcodes and the DSP core 214 executes DSP-type functions, as described further below. In the preferred embodiment, the general purpose CPU core 212 is an X86 core, i.e., is compatible with the X86 family of microprocessors. However, the general purpose CPU core 212 may be any of various types of CPUs, including the PowerPC family, the DEC Alpha, and the SunSparc family of processors, among others. In the following disclosure, the general purpose CPU core 212 is referred to as an X86 core for convenience. The general purpose core 212 may comprise one or more general purpose execution units, and the DSP core 214 may comprise one or more digital signal processing execution units.

As shown, the CPU 102 is coupled through a CPU local bus 104 to a host/PCI/cache bridge or chipset 106. The chipset 106 is preferably similar to the Triton chipset available from Intel Corporation. A second level or L2 cache memory (not shown) may be coupled to a cache controller in the chipset, as desired. Also, for some processors the external cache may be an L1 or first level cache. The bridge or chipset 106 couples through a memory bus 108 to main memory 110. The main memory 110 is preferably DRAM (dynamic random access memory) or EDO (extended data out) memory, or other types of memory, as desired.

The chipset 106 includes various peripherals, including an interrupt system, a real time clock (RTC) and timers, a direct memory access (DMA) system, ROM/Flash memory, communications ports, diagnostics ports, command/status registers, and non-volatile static random access memory (NVSRAM) (all not shown).

The host/PCI/cache bridge or chipset 106 interfaces to a peripheral component interconnect (PCI) bus 120. In the preferred embodiment, a PCI local bus is used. However, it is noted that other local buses may be used, such as the VESA (Video Electronics Standards Association) VL bus. Various types of devices may be connected to the PCI bus 120. In the embodiment shown in FIG. 1, a video/graphics controller or adapter 170 and a network interface controller 140 are coupled to the PCI bus 120. The video adapter connects to a video monitor 172, and the network interface controller 140 couples to a local area network (LAN). A SCSI (small computer systems interface) adapter 122 may also be coupled to the PCI bus 120, as shown. The SCSI adapter 122 may couple to various SCSI devices 124, such as a CD-ROM drive and a tape drive, as desired. Various other devices may be connected to the PCI bus 120, as is well known in the art.

Expansion bus bridge logic 150 may also be coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the MicroChannel architecture (MCA) bus. Various devices may be coupled to the expansion bus 152, such as expansion bus memory 154 and a modem 156.

CPU Block Diagram

Figure 2:
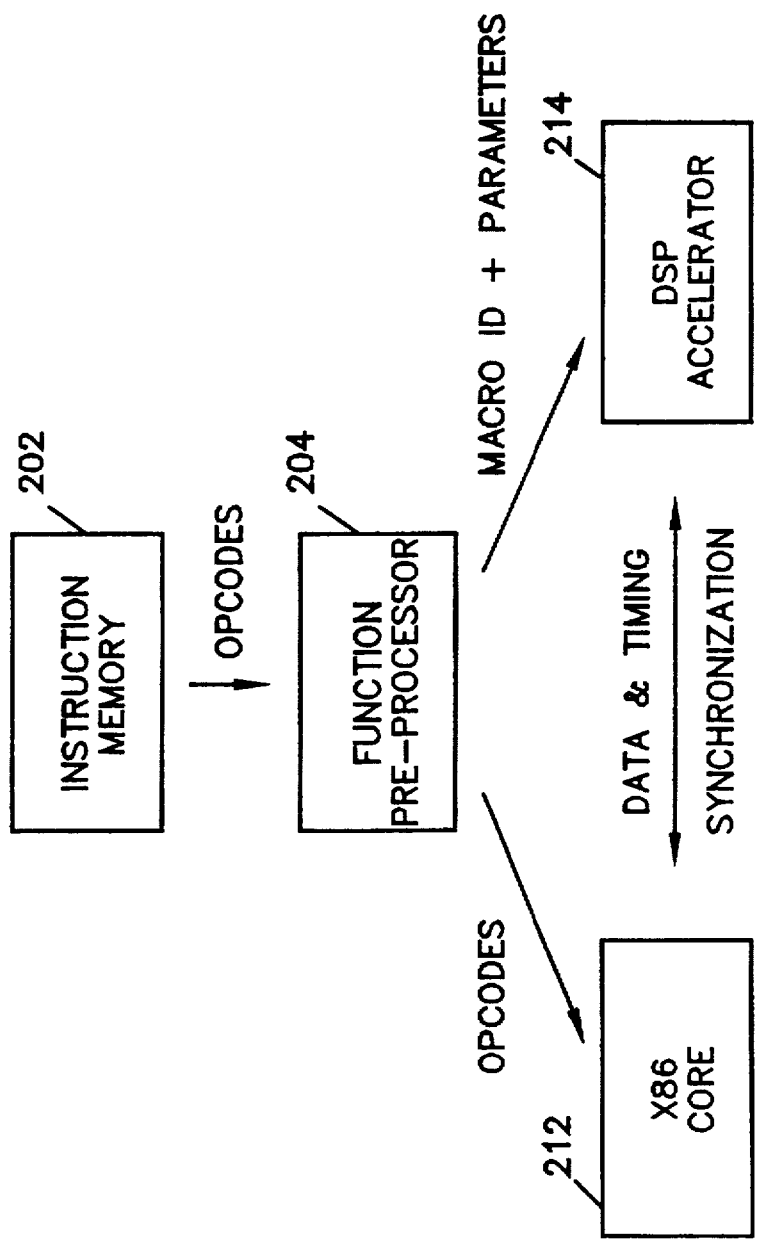
FIG. 2 is a block diagram of the CPU of FIG. 1 including a general purpose CPU core and a DSP core and including a DSP function preprocessor according to the present invention.

Referring now to FIG. 2, a high level block diagram illustrating certain components in the CPU 102 of FIG. 1 is shown. As shown, the CPU 102 includes an instruction cache or instruction memory 202 which receives instructions or opcodes from the system memory 110. Function preprocessor 204 is coupled to the instruction memory 202 and examines instruction sequences or opcode sequences in the instruction memory 202. The function preprocessor 204 is also coupled to the X86 core 212 and the DSP core 214. As shown, the function preprocessor 204 provides instructions or opcodes to the X86 core 212 and also provides information to the DSP core 214.

The X86 core 212 and DSP core 214 are coupled together and provide data and timing signals between each other. In one embodiment, the CPU 102 includes one or more buffers (not shown) which interface between the X86 core 212 and the DSP core 214 to facilitate transmission of data between the X86 core 212 and the DSP core 214.

FIG. 3—Flowchart

Figure 3:
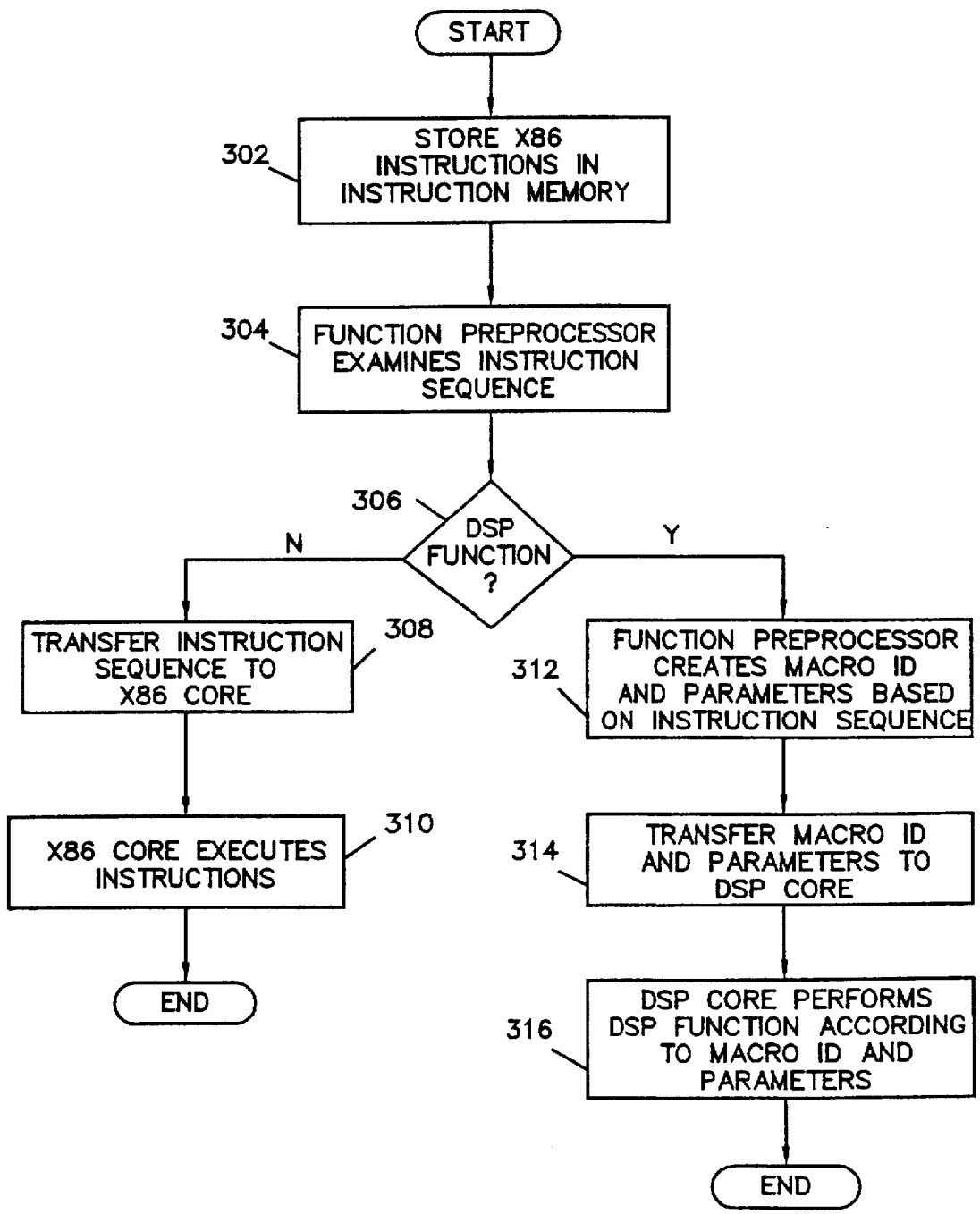
FIG. 3 is a flowchart diagram illustrating operation of the present invention.

Referring now to FIG. 3, a flowchart diagram illustrating operation of the present invention is shown. It is noted that two or more of the steps in FIG. 3 may operate concurrently, and the operation of the invention is shown in flowchart form for convenience. As shown, in step 302 the instruction memory 202 receives and stores a plurality of X86 instructions. The plurality of X86 instructions may include one or more instruction sequences which implement a DSP function. In step 304 the function preprocessor 204 analyzes the opcodes, i.e., an instruction sequence, in the instruction memory 202 and in step 306 intelligently determines if the sequence of instructions are designed or intended to perform a DSP-type function, i.e., determines if the instruction sequence implements a DSP-type function. In the present disclosure, a DSP-type function comprises one or more of the following mathematical functions: correlation, convolution, Fast Fourier Transform, finite impulse response filter, infinite impulse response filter, inner product, and matrix manipulation, among others. The operation of the function preprocessor 204 is described more fully in the description associated with FIG. 4.

If the instructions or opcodes stored in the instruction cache 202 do not correspond to a DSP-type function, the instructions are provided to the X86 core 212 in step 308. Thus, these instructions or opcodes are provided directly from the instruction cache 202 to the X86 core 212 for execution, as occurs in prior art X86 compatible CPUs. After the opcodes are transferred to the X86 core 212, in step 310 the X86 core 212 executes the instructions.

If the function preprocessor 204 detects a sequence of instructions which correspond to or implement a DSP-type function in step 306, then in step 312 the function preprocessor 204 analyzes the sequence of instructions and determines the respective DSP-type function being implemented. In step 312 the function preprocessor 204 maps the sequence of instructions to a respective DSP macro identifier, also referred to as a function identifier. The function preprocessor 204 also analyzes the information in the sequence of opcodes in step 312 and generates zero or more parameters for use by the DSP core or accelerator 214 in executing the function identifier. As shown, in step 314 the function preprocessor 204 provides the function identifier and the parameters to the DSP core 214.

The DSP core 214 receives the function identifier and the associated parameters from the function preprocessor 204 and in step 316 performs the respective DSP function. In the preferred embodiment, the DSP core 214 uses the function identifier to index into a DSP microcode RAM or ROM to execute a sequence of DSP instructions or opcodes. The DSP instructions cause the DSP to perform the desired DSP-type function. The DSP core 214 also uses the respective parameters in executing the DSP function.

As mentioned above, the X86 core 212 and DSP core 214 are coupled together and provide data and timing signals between each other. In the preferred embodiment, the X86 core 212 and DSP core 214 operate substantially in parallel. Thus, while the X86 core 212 is executing one sequence of opcodes, the DSP accelerator 214 may be executing one or more DSP functions corresponding to another sequence of opcodes. Thus, the DSP core 214 does not operate as a slave or co-processor, but rather operates as an independent execution unit or pipeline. The DSP core 214 and the X86 core 212 provide data and timing signals to each other to indicate the status of operations and also to provide any data outputs produced, as well as to ensure data coherency/independence.

Example Operation

The following describes an example of how a string or sequence of X86 opcodes are converted into a function identifier and then executed by the DSP core or accelerator 214 according to the present invention. The following describes an X86 opcode sequence which performs a simple inner product computation, wherein the inner product is averaged over a vector comprising 20 values:

X86 Code (Simple inner product)

| 1 | Mov ECX, num_samples; | {Set up parameters for macro} |
|---|---|---|
| 1 | Mov ESI, address_1 | |
| 1 | Mov EDI, address_2 | |
| 1 | Mov EAX, 0; | {Initialize vector indices} |
| 1 | Mov EBX, 0; | |
| 4 | FLdz; | {Initialize sum of products} |
|   | Again: | |
|   |   | {Update counter} |
| 4 | Fld dword ptr [ESI+EAX*4]; | {Get vector elements and} |
| 1 | Inc EAX; | {update indices} |
| 4 | Fld dword ptr [EDI+EBX*4]; | |
| 1 | Inc EBX; | |
| 13 | FMulP St(1), St; | {Compute product term} |
| 7 | FAddP St(1), St; | {Add term to sum} |
| 1 | LOOP Again; | {Continue if more terms} |

As shown, the X86 opcode instructions for a simple inner product comprised a plurality of move instructions followed by an F-load function wherein this sequence is repeated a plurality of times. If this X86 opcode sequence were executed by the X86 core 212, the execution time for this inner product computation would require 709 cycles (9+20 X 35). This assumes i486 timing, concurrent execution of floating point operations, and cache hits for all instructions and data required for the inner product computation. The function preprocessor 204 analyzes the sequence of opcodes and detects that the opcodes are performing an inner product computation. The function preprocessor 204 then converts this entire sequence of X86 opcodes into a single macro or function identifier and one or more parameters. An example macro or function identifier that is created based on the X86 opcode sequence shown above would be as follows:

Example Macro (as it appears in assembler)

```
Inner_product_simple (
    address_1,      {Data vector}
    address_2;      {Data vector}
    num_sample);{Length of vector}
```

This function identifier and one or more parameters are provided to the DSP core 214. The DSP core 214 uses the macro provided from the function preprocessor 204 to load one or more DSP opcodes or instructions which execute the DSP function. In the preferred embodiment, the DSP core 214 uses the macro to index into a ROM which contains the instructions used for executing the DSP function. In this example, the DSP code or instructions executed by the DSP core 214 in response to receiving the macro described above are shown below:

DSP Code (Simple inner product)

```
1   Cntr =  num_samples;         {Set up parameters from macro}
1   ptr1 =  address_1;
1   ptr2 =  address_2
1   MAC  =  0;                    {Initialize sum of products}
1   reg1 =  *ptr1++,              {Pre-load multiplier input registers}
    reg2 =  *ptr2++;
1   Do LOOP until ce;             {Specify loop parameters}
1   MAC += reg1   *reg2,          {Form sum of products}
    reg1 =  *ptr1 ++,
    reg2 =  *ptr2 ++;
    LOOP:                         {Continue if more terms}
```

In this example, the DSP core 214 performs this inner product averaged over a vector comprising 20 values and consumes a total of 26 cycles (6+20 X 1). This assumes typical DSP timing, including a single cycle operation of instructions, zero overhead looping and cache hits for all instructions and data. Thus, the DSP core 214 provides a performance increase of over 28 times of that where the X86 core 212 executes this DSP function.

Figure 4:
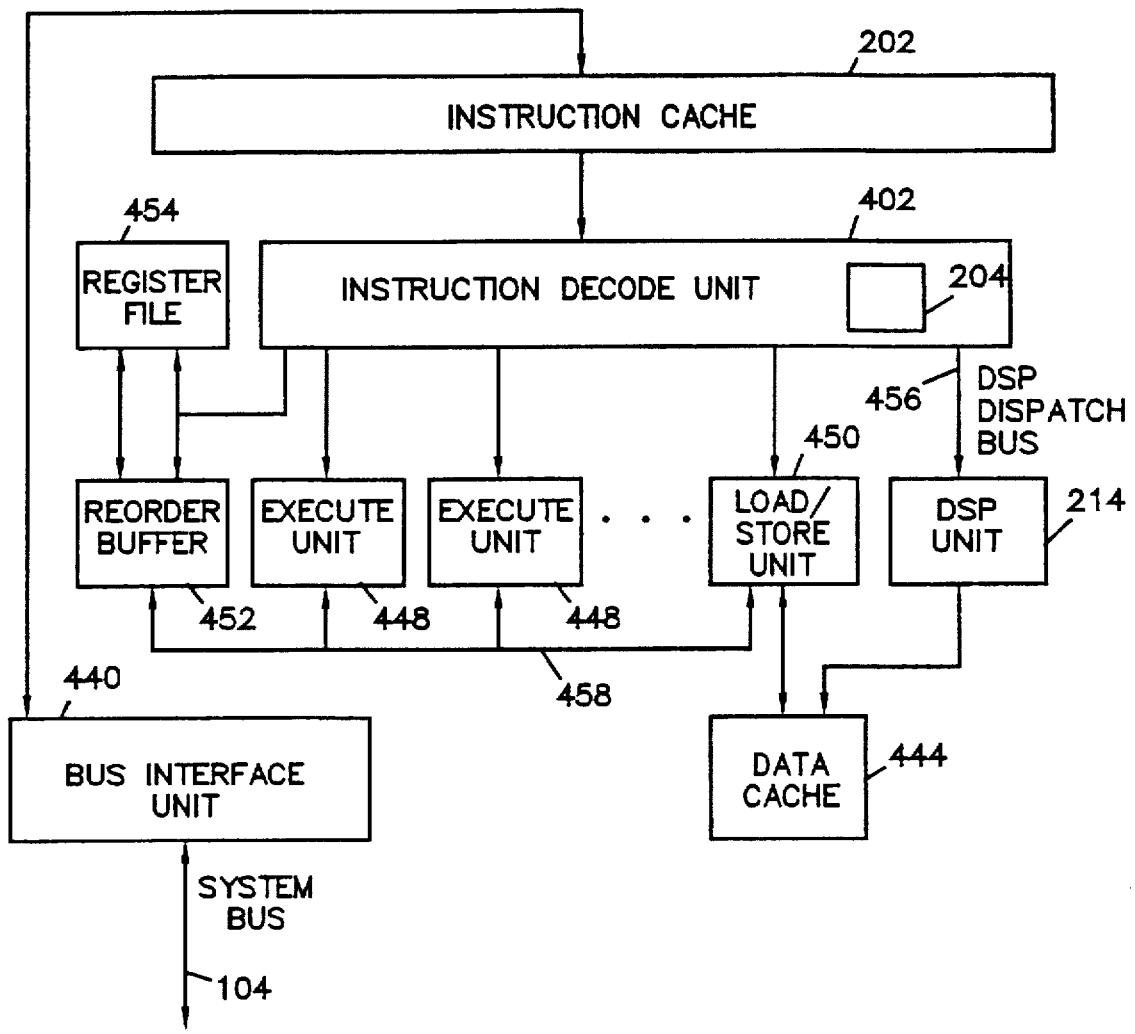
FIG. 4 is a more detailed block diagram of the CPU of FIG. 1.

FIG. 4—CPU Block Diagram

Referring now to FIG. 4, a more detailed block diagram is shown illustrating the internal components of the CPU 102 according to the present invention. Elements in the CPU 102 that are not necessary for an understanding of the present invention are not described for simplicity. As shown, in the preferred embodiment the CPU 102 includes a bus interface unit 440, instruction cache 202, a data cache 444, an instruction decode unit 402, a plurality of execute units 448, a load/store unit 450, a reorder buffer 452, a register file 454, and a DSP unit 214.

As shown, the CPU 102 includes a bus interface unit 440 which includes circuitry for performing communication upon CPU bus 104. The bus interface unit 440 interfaces to the data cache 444 and the instruction cache 202. The instruction cache 202 prefetches instructions from the system memory 110 and stores the instructions for use by the CPU 102. The instruction decode unit 402 is coupled to the instruction cache 202 and receives instructions from the instruction cache 202. The instruction decode unit 402 includes function preprocessor 204, as shown. The function preprocessor 204 in the instruction decode unit 402 is coupled to the instruction cache 202. The instruction decode unit 402 further includes an instruction alignment unit as well as other logic.

The instruction decode unit 402 couples to a plurality of execution units 448, reorder buffer 452, and load/store unit 450. The plurality of execute units are collectively referred to herein as execute units 448. Reorder buffer 452, execute units 448, and load/store unit 450 are each coupled to a forwarding bus 458 for forwarding of execution results. Load/store unit 450 is coupled to data cache 444. DSP unit 214 is coupled directly to the instruction decode unit 402 through the DSP dispatch bus 456. It is noted that one or more DSP units 214 may be coupled to the instruction decode unit 402.

Bus interface unit 440 is configured to effect communication between microprocessor 102 and devices coupled to system bus 104. For example, instruction fetches which miss instruction cache 202 are transferred from main memory 110 by bus interface unit 440. Similarly, data requests performed by load/store unit 450 which miss data cache 444 are transferred from main memory 110 by bus interface unit 440. Additionally, data cache 444 may discard a cache line of data which has been modified by microprocessor 102. Bus interface unit 440 transfers the modified line to main memory 110.

Instruction cache 202 is preferably a high speed cache memory for storing instructions. It is noted that instruction cache 202 may be configured into a set-associative or direct mapped configuration. Instruction cache 202 may additionally include a branch prediction mechanism for predicting branch instructions as either taken or not taken. A "taken" branch instruction causes instruction fetch and execution to continue at the target address of the branch instruction. A "not taken" branch instruction causes instruction fetch and execution to continue at the instruction subsequent to the branch instruction. Instructions are fetched from instruction cache 202 and conveyed to instruction decode unit 402 for decode and dispatch to an execution unit. The instruction cache 202 may also include a macro prediction mechanism for predicting macro instructions and taking the appropriate action.

Instruction decode unit 402 decodes instructions received from the instruction cache 202 and provides the decoded instructions to the execute units 448, the load/store unit 450, or the DSP unit 214. The instruction decode unit 402 is preferably configured to dispatch an instruction to more than one execute unit 448.

The instruction decode unit 402 includes function preprocessor 204. According to the present invention, the function preprocessor 204 in the instruction decode unit 402 is configured to detect X86 instruction sequences in the instruction cache 202 which correspond to or perform DSP functions. If such an instruction sequence is detected, the function preprocessor 204 generates a corresponding macro and parameters and transmits the corresponding DSP macro and parameters to the DSP Unit 214 upon DSP dispatch bus 456. The DSP unit 214 receives the DSP function macro and parameter information from the instruction decode unit 402 and performs the indicated DSP function. Additionally, DSP unit 214 is preferably configured to access data cache 444 for data operands. Data operands may be stored in a memory within DSP unit 214 for quicker access, or may be accessed directly from data cache 444 when needed. Function preprocessor 204 provides feedback to instruction cache 202 to ensure that sufficient look ahead instructions are available for macro searching.

If the X86 instructions in the instruction cache 202 are not intended to perform a DSP function, the instruction decode unit 402 decodes the instructions fetched from instruction cache 202 and dispatches the instructions to execute units 448 and/or load/store unit 450. Instruction decode unit 402 also detects the register operands used by the instruction and requests these operands from reorder buffer 452 and register file 454. Execute units 448 execute the X86 instructions as is known in the art.

Also, if the DSP 214 is not included in the CPU 102 or is disabled through software, instruction decode unit 402 dispatches all X86 instructions to execute units 448. Execute units 448 execute the X86 instructions as in the prior art. In this manner, if the DSP unit 214 is disabled, the X86 code, including the instructions which perform DSP functions, are executed by the X86 core, as is currently done in prior art X86 microprocessors. Thus, if the DSP unit 214 is disabled, the program executes correctly even though operation is less efficient than the execution of a corresponding routine in the DSP 214. Advantageously, the enabling or disabling, or the presence or absence, of the DSP core 214 in the CPU 102 does not affect the correct operation of the program.

In one embodiment, execute units 448 are symmetrical execution units that are each configured to execute the instruction set employed by microprocessor 102. In another embodiment, execute units 448 are asymmetrical execution units configured to execute dissimilar instruction subsets. For example, execute units 448 may include a branch execute unit for executing branch instructions, one or more arithmetic/logic units for executing arithmetic and logical instructions, and one or more floating point units for executing floating point instructions. Instruction decode unit 402 dispatches an instruction to an execute unit 448 or load/store unit 450 which is configured to execute that instruction.

Load/store unit 450 provides an interface between execute units 448 and data cache 444. Load and store memory operations are performed by load/store unit 450 to data cache 444. Additionally, memory dependencies between load and store memory operations are detected and handled by load/store unit 450.

Execute units 448 and load/store unit(s) 450 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservations stations. The centralized reservation station is coupled between instruction decode unit 402, execute units 448, and load/store unit 450. Such an embodiment may perform the dispatch function within the centralized reservation station.

CPU 102 preferably supports out of order execution and employs reorder buffer 452 for storing execution results of speculatively executed instructions and storing these results into register file 454 in program order, for performing dependency checking and register renaming, and for providing for mispredicted branch and exception recovery. When an instruction is decoded by instruction decode unit 402, requests for register operands are conveyed to reorder buffer 452 and register file 454. In response to the register operand requests, one of three values is transferred to the execute unit 448 and/or load/store unit 450 which receives the instruction: (1) the value stored in reorder buffer 452, if the value has been speculatively generated; (2) a tag identifying a location within reorder buffer 452 which will store the result, if the value has not been speculatively generated; or (3) the value stored in the register within register file 454, if no instructions within reorder buffer 452 modify the register. Additionally, a storage location within reorder buffer 452 is allocated for storing the results of the instruction being decoded by instruction decode unit 402. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 448 or load/store unit 450 execute an instruction, the tag assigned to the instruction by reorder buffer 452 is conveyed upon result bus 458 along with the result of the instruction. Reorder buffer 452 stores the result in the indicated storage location. Additionally, execute units 448 and load/store unit 450 compare the tags conveyed upon result bus 458 with tags of operands for instructions stored therein. If a match occurs, the unit captures the result from result bus 458 and stores it with the corresponding instruction. In this manner, an instruction may receive the operands it is intended to operate upon. Capturing results from result bus 458 for use by instructions is referred to as "result forwarding".

Instruction results are stored into register file 454 by reorder buffer 452 in program order. Storing the results of an instruction and deleting the instruction from reorder buffer 452 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 452 discards the instructions subsequent to the mispredicted branch instructions. Instructions thus discarded are also flushed from execute units 448, load/store unit 450, and instruction decode unit 402.

Register file 454 includes storage locations for each register defined by the microprocessor architecture employed by microprocessor 102. For example, in the preferred embodiment where the CPU 102 includes an X86 microprocessor architecture, the register file 454 includes locations for storing the EAX, EBX, ECX, EDX, ESI, EDI, ESP, and EBP register values.

Data cache 444 is a high speed cache memory configured to store data to be operated upon by microprocessor 102. It is noted that data cache 444 may be configured into a set-associative or direct-mapped configuration.

For more information regarding the design and operation of an X86 compatible microprocessor, please see co-pending patent application entitled "High Performance Superscalar Microprocessor", Ser. No. 08/146,382, filed Oct. 29, 1993 by Witt, et al, and co-pending patent application entitled "Superscalar Microprocessor Including a High Performance Instruction Alignment Unit", Ser. No. 08/377,843, filed Jan. 25, 1995 by Witt, et al, which are both assigned to the assignee of the present application, and which are both hereby incorporated by reference in their entirety as though fully and completely set forth herein. Please also see "Superscalar Microprocessor Design" by Mike Johnson, Prentice-Hall, Englewood Cliffs, N.J., 1991, which is hereby incorporated herein by reference in its entirety.

Figure 5:
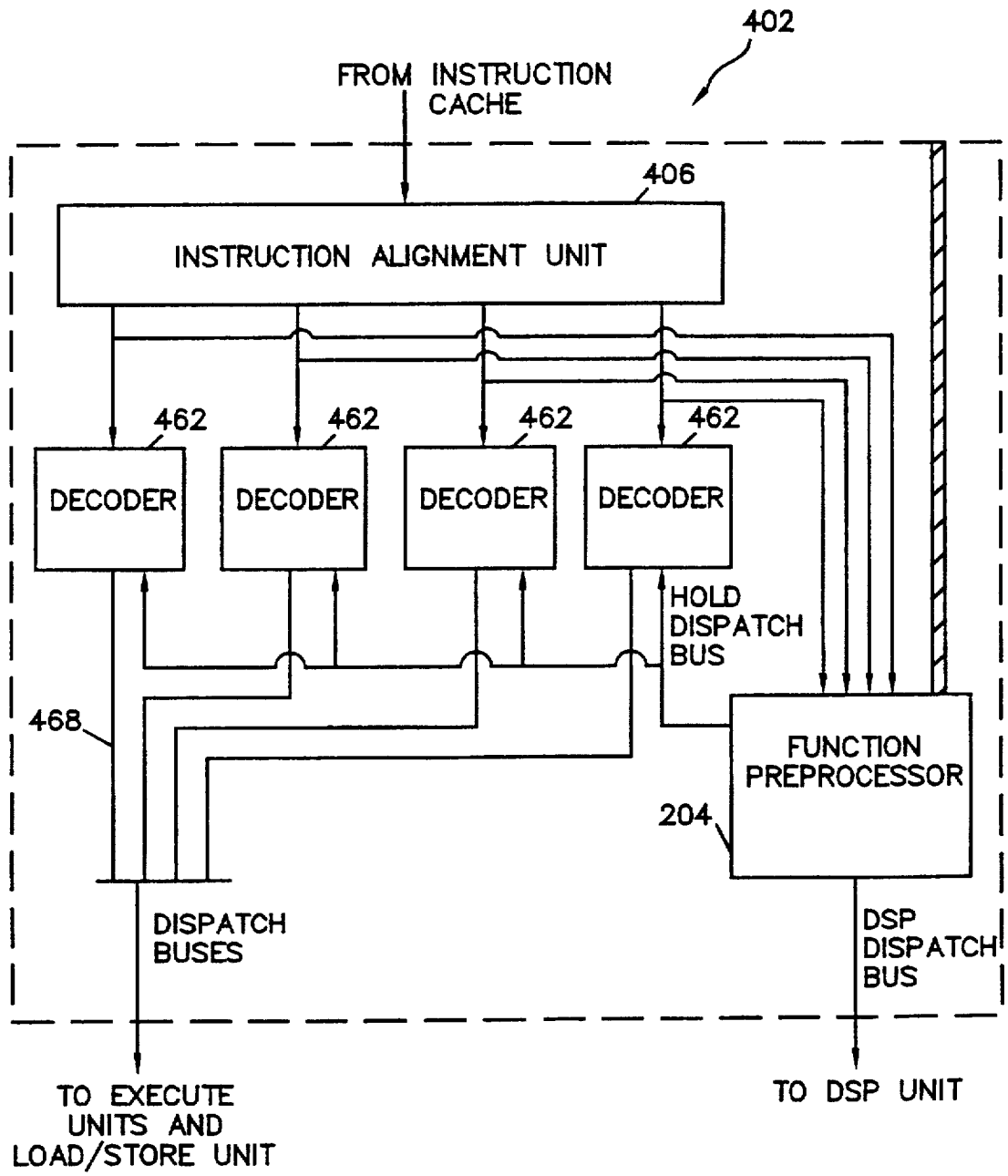
FIG. 5 is a block diagram of the Instruction Decode Unit of FIG. 4.

FIG. 5—Instruction Decode Unit

Referring now to FIG. 5, one embodiment of instruction decode unit 402 is shown. Instruction decode unit 402 includes an instruction alignment unit 460, a plurality of decoder circuits 462, and a DSP function preprocessor 204. Instruction alignment unit 460 is coupled to receive instructions fetched from instruction cache 202 and aligns instructions to decoder circuits 462.

Instruction alignment unit 260 routes instructions to decoder circuits 462. In one embodiment, instruction alignment unit 260 includes a byte queue in which instruction bytes fetched from instruction cache 202 are queued. Instruction alignment unit 460 locates valid instructions from within the byte queue and dispatches the instructions to respective decoder circuits 462. In another embodiment, instruction cache 202 includes predecode circuitry which predecodes instruction bytes as they are stored into instruction cache 202. Start and end byte information indicative of the beginning and end of instructions is generated and stored within instruction cache 202. The predecode data is transferred to instruction alignment unit 460 along with the instructions, and instruction alignment unit 460 transfers instructions to the decoder circuits 462 according to the predecode information.

The function preprocessor 204 is also coupled to the instruction cache 202 and operates to detect instruction sequences in the instruction cache 202 which perform DSP instructions. Decoder circuits 462 and function preprocessor 204 receive X86 instructions from the instruction alignment unit 460. The function preprocessor 204 provides an instruction disable signal upon a DSP bus to each of the decoder units 462.

Each decoder circuit 462 decodes the instruction received from instruction alignment unit 460 to determine the register operands manipulated by the instruction as well as the unit to receive the instruction. An indication of the unit to receive the instruction as well as the instruction itself are conveyed upon a plurality of dispatch buses 468 to execute units 448 and load/store unit 450. Other buses, not shown, are used to request register operands from reorder buffer 452 and register file 454.

The function preprocessor analyzes streams or sequences of X86 instructions from the instruction cache 202 and determines if a DSP function if being executed. If so, the function preprocessor 204 maps the X86 instruction stream to a DSP macro and zero or more parameters and provides this information to one of the one or more DSP units 214. In one embodiment, when the respective instruction sequence reaches the decoder circuits 462, the function preprocessor 204 asserts a disable signal to each of the decoders 462 to disable operation of the decoders 462 for the detected instruction sequence. When a decoder circuit 462 detects the disable signal from function preprocessor 204, the decoder circuit 462 discontinues decoding operations until the disable signal is released. After the instruction sequence corresponding to the DSP function has exited the instruction cache 202, the function preprocessor 204 removes the disable signal to each of the decoders 462. In other words, once the function preprocessor 204 detects the end of the X86 instruction sequence, the function preprocessor 204 removes the disable signal to each of the decoders 462, and the decoders resume operation.

Each of decoder circuits 462 is configured to convey an instruction upon one of dispatch buses 468, along with an indication of the unit or units to receive the instruction. In one embodiment, a bit is included within the indication for each of execute units 448 and load/store unit 450. If a particular bit is set, the corresponding unit is to execute the instruction. If a particular instruction is to be executed by more than one unit, more than one bit in the indication may be set.

Function Preprocessor

Figure 6:
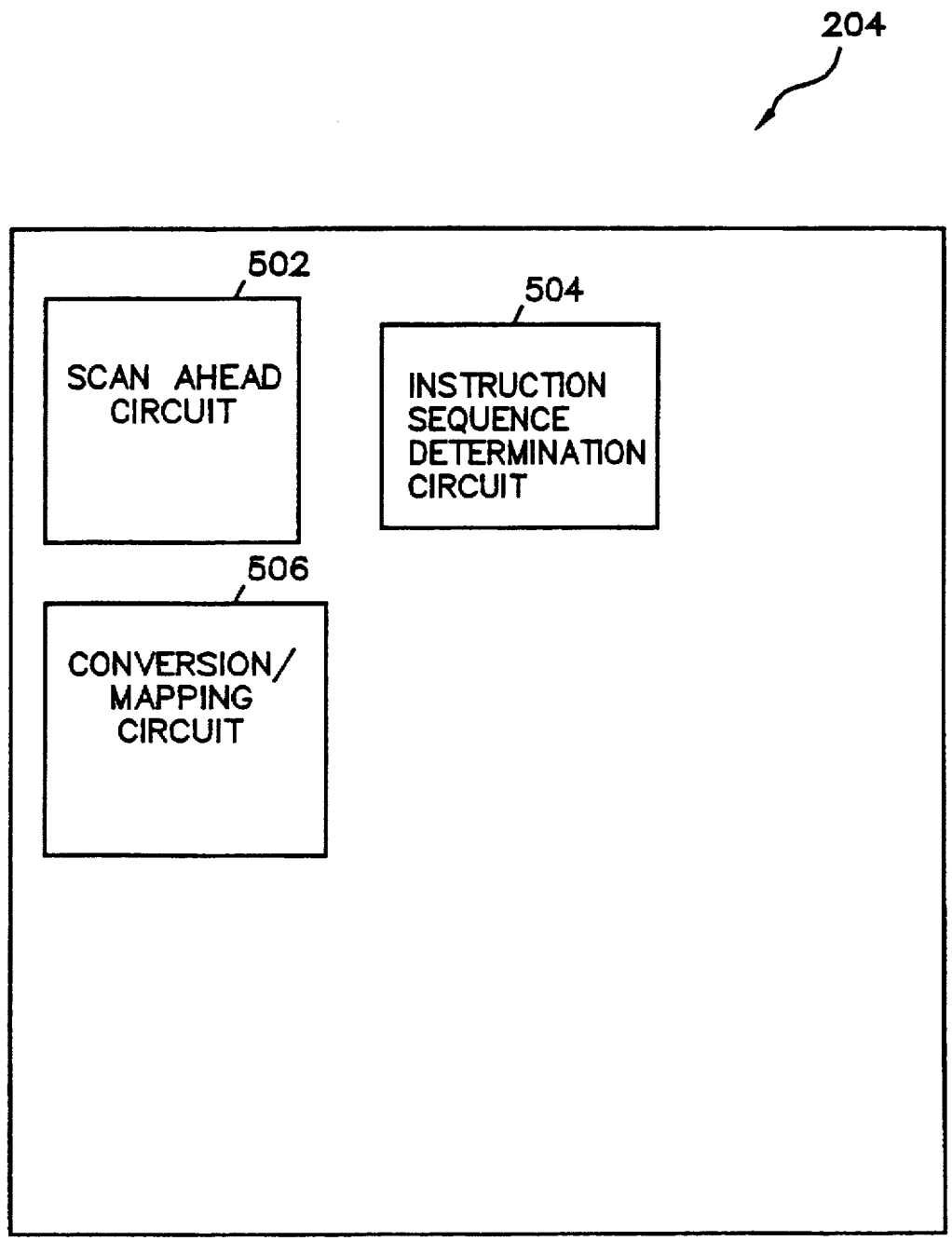
FIG. 6 is a block diagram of the function preprocessor according to one embodiment of the invention.

Referring now to FIG. 6, a block diagram of the function preprocessor 204 is shown according to one embodiment of the invention. As shown, in this embodiment the function preprocessor 204 comprises a scan-ahead circuit 502 for examining or scanning sequences of instructions in the instruction memory or instruction cache 202. In one embodiment, the scan-ahead circuit or means 502 examines sequences of instructions stored in the instruction memory 202 prior to operation of the instruction decoder 402 in decoding the instructions comprising the respective sequence of instructions being scanned. Thus the scan-ahead circuit 502 looks ahead at instruction sequences in the instruction cache 202 before the respective instructions are provided to the instruction decoder 402.

The function preprocessor 204 further comprises an instruction sequence determination circuit 504 for determining whether a sequence of instructions in the instruction memory 202 implements a digital signal processing function. This determination can be performed in various ways, as described further below.

The function preprocessor 204 further comprises a conversion/mapping circuit 506 for converting a sequence of instructions in the instruction memory 202 which implements a digital signal processing function into a digital signal processing function identifier or macro identifier and zero or more parameters. Thus if the instruction sequence determination circuit 504 determines that a sequence of instructions in the instruction memory 202 implements an FFT function, the conversion/mapping circuit 506 converts this sequence of instructions into a FFT function identifier and zero or more parameters.

Figure 7:
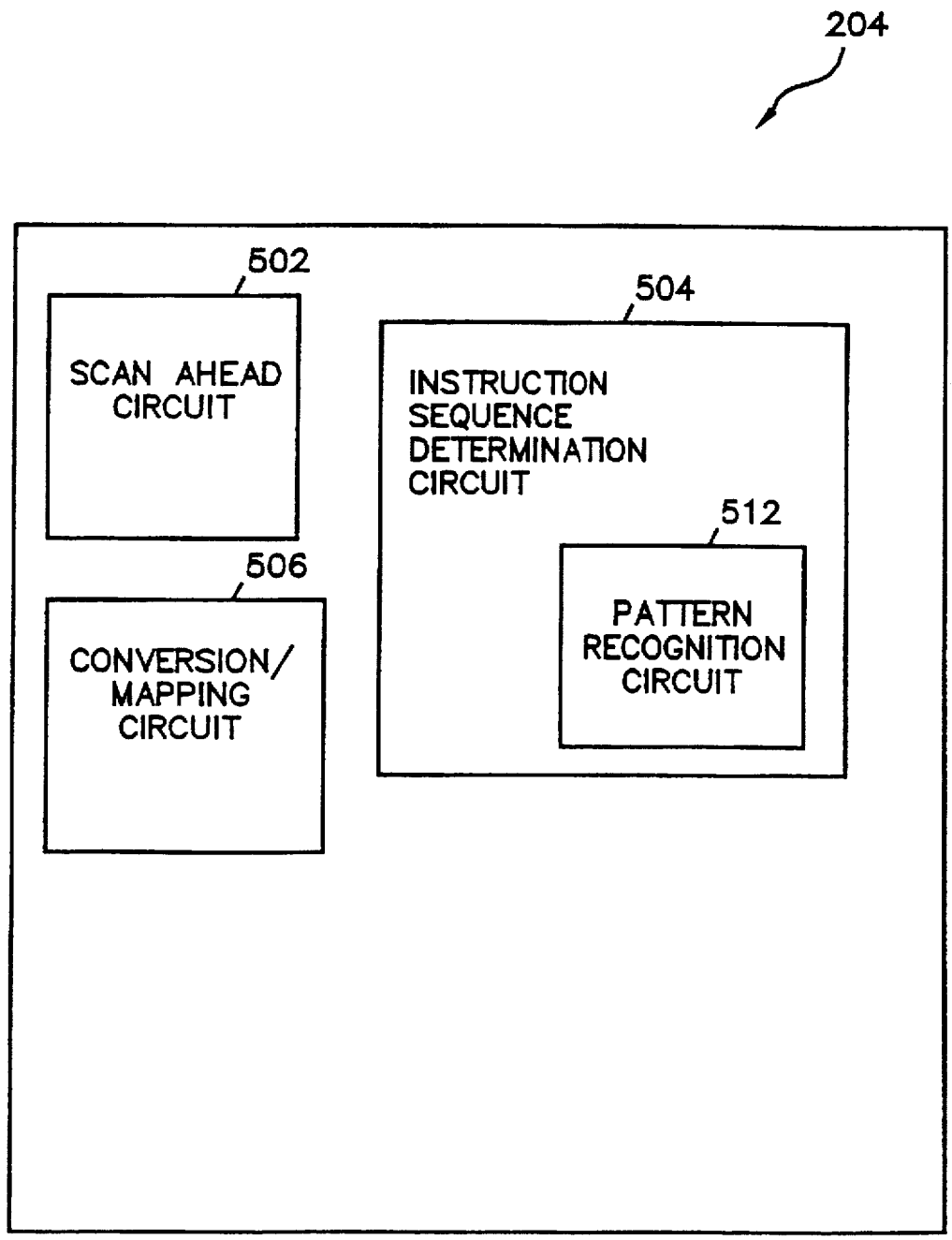
FIG. 7 is a block diagram of the function preprocessor including a pattern recognition detector according to one embodiment of the invention.

FIG. 7—Pattern Recognition Circuit

Referring now to FIG. 7, in one embodiment the function preprocessor 204 includes a pattern recognition circuit or pattern recognition detector 512 which determines whether a sequence of instructions in the instruction memory 202 implements a digital signal processing function. The pattern recognition circuit 512 stores a plurality of patterns of instruction sequences which implement digital signal processing functions. The pattern recognition circuit 512 stores bit patterns which correspond to opcode sequences of machine language instructions which perform DSP functions, such as FFTs, inner products, matrix manipulation, correlation, convolution, etc.

Figure 8:
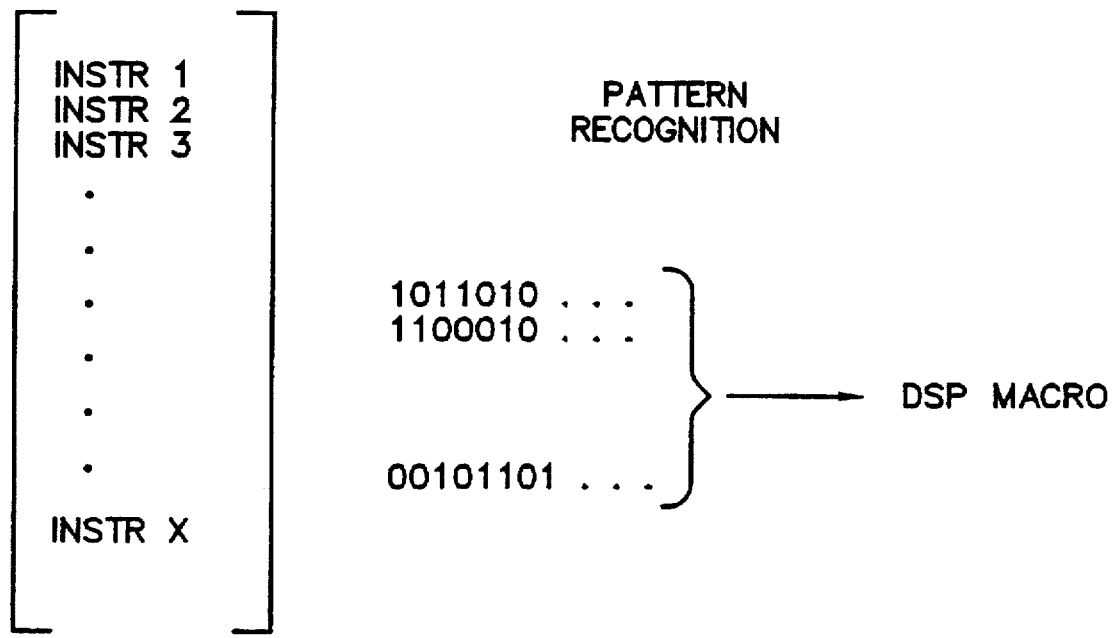
FIG. 8 illustrates operation of the pattern recognition detector of FIG. 7.

The pattern recognition detector 512 examines a sequence of instructions stored in the instruction memory 202 and compares the sequence of instructions with the plurality of stored patterns. Operation of the pattern recognition detector 512 is shown in FIG. 8. In one embodiment, the pattern recognition detector 512 compares each of the patterns with an instruction sequence at periodic locations in the instruction sequence. Alternatively, the pattern recognition detector 512 compares each of the patterns with an instruction sequence at predefined locations in the instruction sequence. The pattern recognition detector 512 may include a look-up table as the unit which performs the pattern comparisons, as desired. The pattern recognition detector 512 may also perform macro prediction on instruction sequences to improve performance.

The pattern recognition detector 512 determines whether the sequence of instructions in the instruction memory 202 substantially matches one of the plurality of stored patterns. A substantial match indicates that the sequence of instructions implements a digital signal processing function. In the preferred embodiment, a substantial match occurs where the instruction sequence matches a stored pattern by greater than 90%. Other matching thresholds, such as 95%, or 100%, may be used, as desired. If a match occurs, the pattern recognition detector 512 determines the type of DSP function pattern which matched the sequence of instructions and passes this DSP function type to the conversion/mapping circuit 506.

Figure 9:
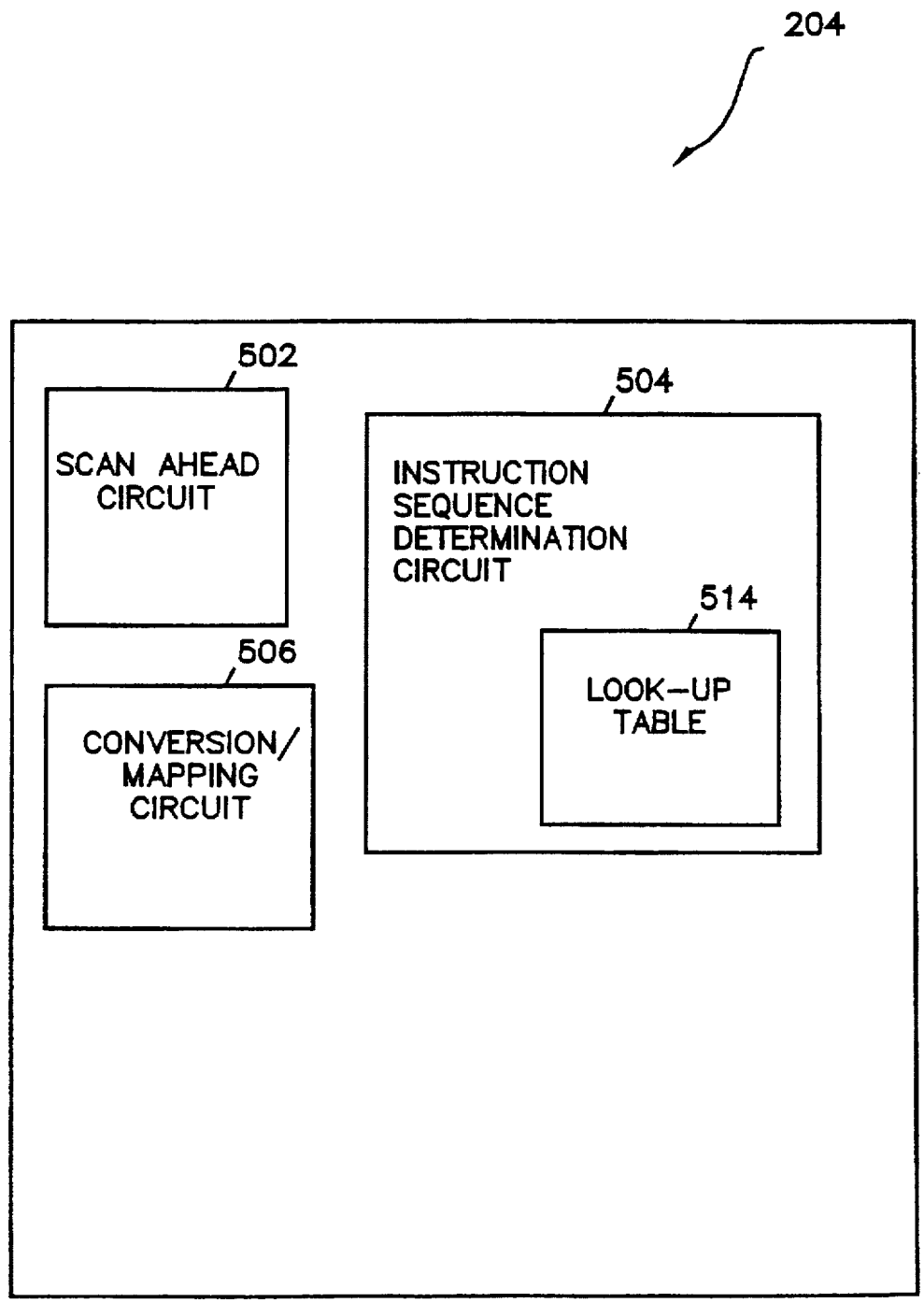
FIG. 9 is a block diagram of the function preprocessor including a look-up table according to one embodiment of the invention.

FIG. 9—Look-up Table

Referring now to FIG. 9, in another embodiment the function preprocessor 204 includes a look-up table 514 which determines whether a sequence of instructions in the instruction memory 202 implements a digital signal processing function. In this embodiment, the look-up table 514 may be in addition to, or instead of, the pattern recognition detector 512.

In an embodiment where the function preprocessor 204 includes only the look-up table 514, the look-up table 514 stores a plurality of patterns wherein each of the patterns is at least a subset of an instruction sequence which implements a digital signal processing function. Thus, this embodiment is similar to the embodiment of FIG. 6 described above, except that the function preprocessor 204 includes the look-up table 514 instead of the pattern recognition detector 512 for detecting instruction sequences which implement DSP functions. In addition, in this embodiment, the look-up table 514 stores smaller patterns which correspond to smaller sequences of instructions, i.e., subsets of instruction sequences, which implement DSP functionality. In this embodiment, the look-up table 514 requires an exact match with a corresponding sequence of instructions. If an exact match does not occur, then the sequence of instructions are passed to the one or more general purpose execution units, i.e., the general purpose CPU core, for execution.

Figure 10:
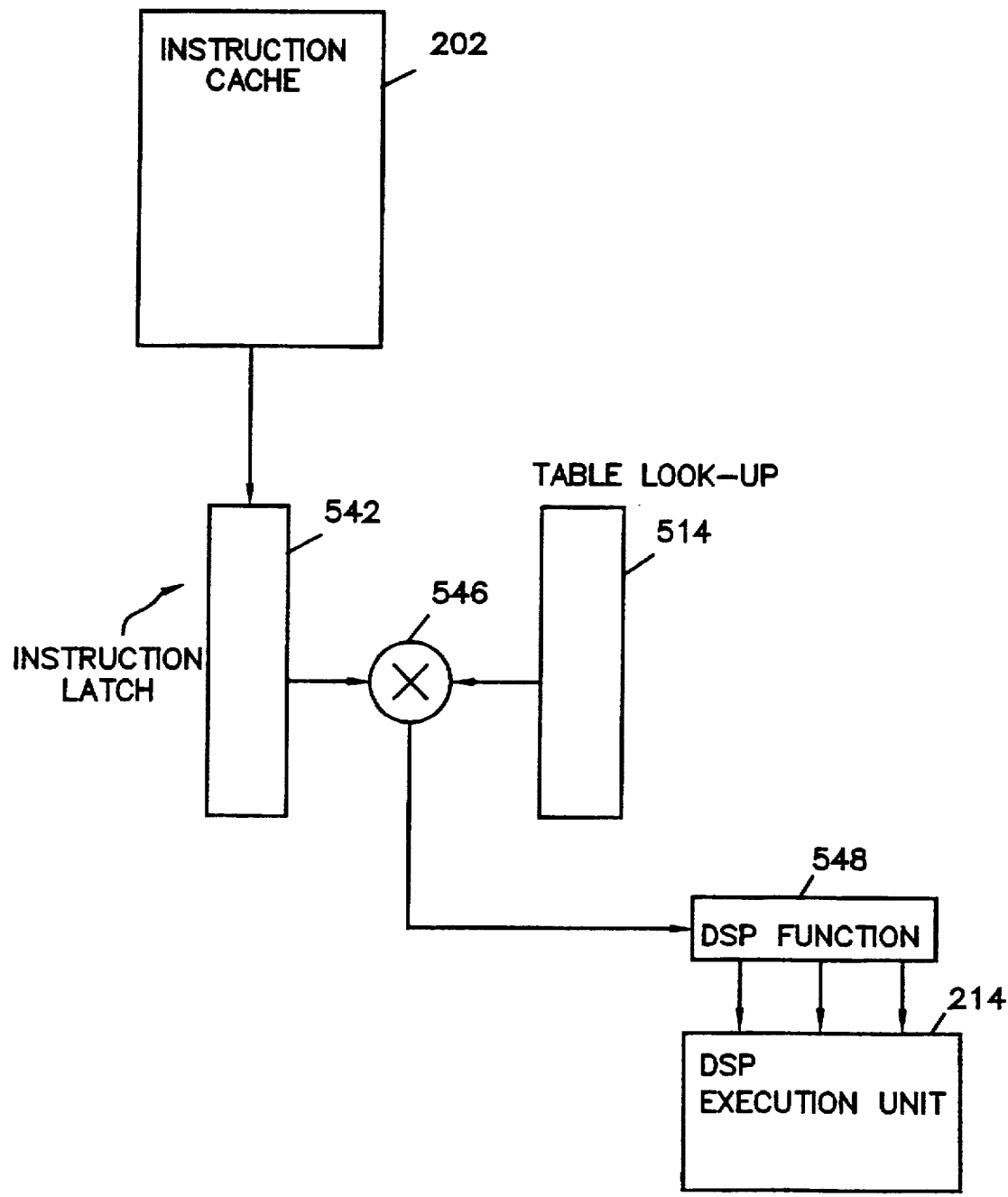
FIG. 10 illustrates operation of the look-up table of FIG. 9.

FIG. 10 illustrates operation of the look-up table 514 in this embodiment. As shown, a sequence of instructions in the instruction cache 202 are temporarily stored in the instruction latch 542. The contents of the instruction latch 542 are then compared with each of the entries in the look-up table 514 by element 546. If the contents of the instruction latch 542 exactly match one of the entries in the look-up table 514, then the DSP function or instruction 548 which corresponds to this entry is provided to the DSP execution unit 214.

In the above embodiments of FIGS. 7 and 9, the pattern recognition detector 512 and/or the look-up table 514 are configured to determine that an instruction sequence implements a DSP function only when the determination can be made with relative certainty. This is because a "missed" instruction sequence, i.e., an instruction sequence which implements a DSP function but which was not detected as implementing a DSP function, will not affect operation of the CPU 102, since the general purpose core or execution units can execute the instruction sequence. However, an instruction sequence which does not implement a DSP function that is mis-identified as a sequence which does implement a DSP function is more problematic, and could result in possible erroneous operation. Thus it is anticipated that the pattern recognition detector 512 or the look-up table 514 may not accurately detect every instruction sequence which implements a DSP function. In this instance, the instruction sequence is passed on to one of the general purpose execution units, as occurs in the prior art.

Figure 11:
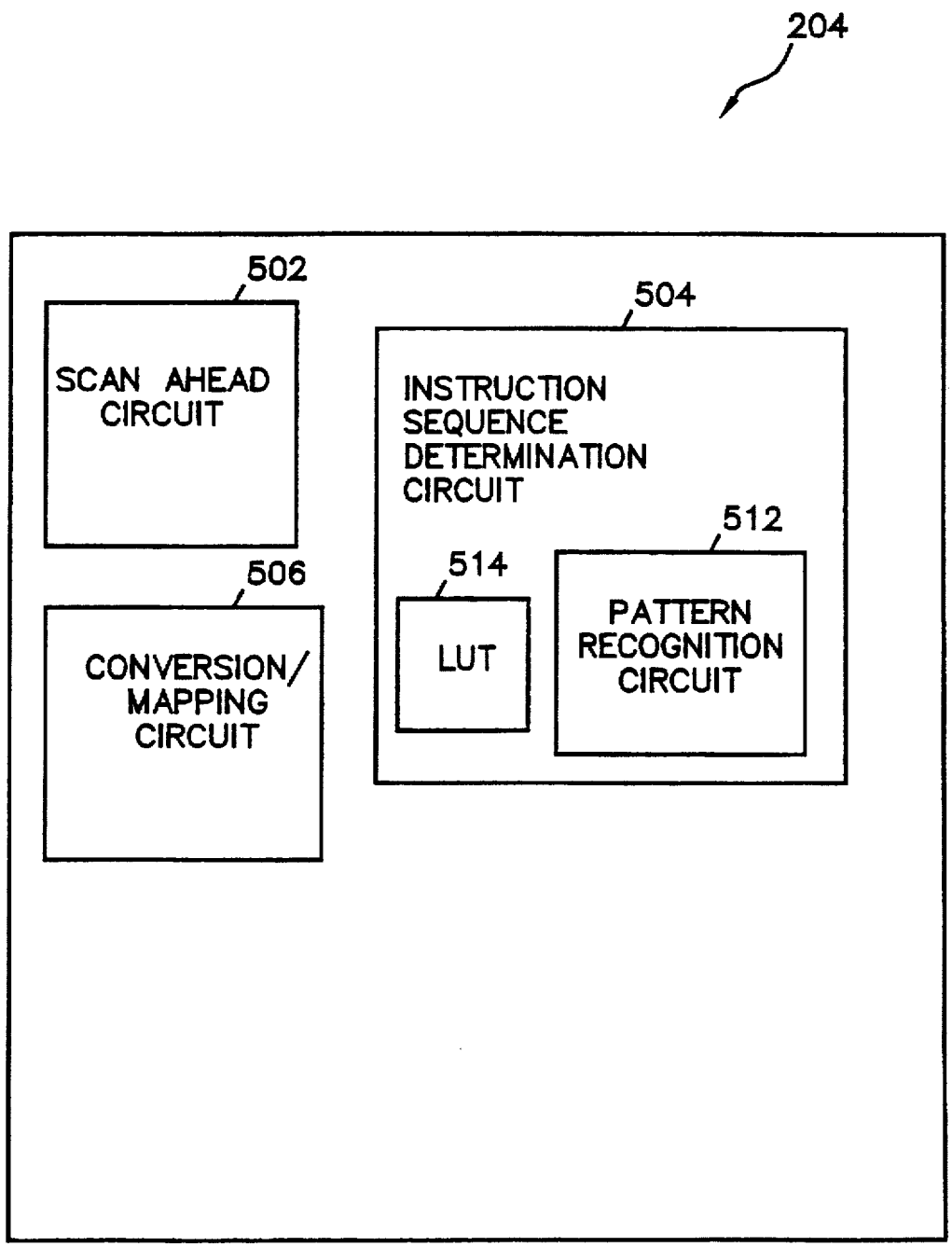
FIG. 11 is a block diagram of the function preprocessor including a pattern recognition detector and a look-up table according to one embodiment of the invention.

FIG. 11—Pattern Recognition Circuit with Look-up Table

Referring now to FIG. 11, in another embodiment the function preprocessor 204 includes both the look-up table 514 and the pattern recognition detector 512. In this embodiment, the function decoder 204 uses each of the look-up table 514 and the recognition detector 512 to determine whether a sequence of instructions in the instruction memory 202 implements a digital signal processing function. This embodiment preferably uses a two stage analysis of a sequence of X86 instructions, whereby the look-up table 514 first determines if the sequence likely implements a DSP function, and then the pattern recognition detector 512 determines the type of DSP function being implemented. Alternatively, the pattern recognition detector 512 first determines if the sequence likely implements a DSP function, and then the look-up table 514 determines the type of DSP function being implemented.

In this embodiment, the look-up table 514 stores small patterns which correspond to atomic DSP instructions. For example, the look-up table 514 stores a pattern of X86 instructions which perform a multiply accumulate add function, which is common in DSP architectures. The look-up table 514 also stores other patterns which implement atomic DSP instructions. The pattern recognition detector 512 stores patterns corresponding to entire DSP functions, such as an FFT, a correlation, and a convolution, among others.

First, the look-up table 514 compares each entry with incoming instruction sequences and stores the number of "hits" or matches for a sequence. If the number of matches is greater than a certain defined threshold, then the sequence includes a number of DSP-type "instructions" and thus is presumed to implement a DSP function. In this instance, the pattern recognition detector 512 is enabled to compare the entire sequence with each of the stored patterns to determine the type of DSP function being implemented by the X86 instruction sequence. As mentioned above, the pattern recognition detector 512 determines if the instruction sequence substantially matches one of the stored patterns.

Conclusion

Therefore, the present invention comprises a novel CPU or microprocessor architecture which optimizes execution of DSP and/or mathematical operations while maintaining backwards compatibility with existing software.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A central processing unit which performs digital signal processing functions, comprising:

an instruction memory for storing a plurality of instructions, wherein said instruction memory stores one or more sequences of instructions which implement a digital signal processing function;

an instruction decoder coupled to the instruction memory for decoding instructions stored in the instruction memory;

a function preprocessor coupled to the instruction memory, wherein the function preprocessor includes:

scan ahead means for examining said one or more sequences of instructions stored in said instruction memory, wherein said scan ahead means examines said one or more sequences of instructions stored in said instruction memory prior to operation of said instruction decoder in decoding said instructions comprising said one or more sequences of instructions;

means for determining whether a sequence of instructions in said instruction memory implements a digital signal processing function;

means for disabling operation of said instruction decoder for a sequence of instructions, wherein said means for disabling disables operation of said instruction decoder for a sequence of instructions if said means for determining determines that said sequence of instructions in said instruction memory implements a digital signal processing function; and means for converting a sequence of instructions in said instruction memory which implements a digital signal processing function into a digital signal processing identifier;

one or more general purpose execution units coupled to the function preprocessor for executing instructions in said instruction memory; and one or more digital signal processing execution units coupled to the function preprocessor for performing digital signal processing functions, wherein the one or more digital signal processing execution units receive said digital signal processing function identifier and perform a digital signal processing function in response to said received digital signal processing function identifier from said function preprocessor.

2. The central processing unit of claim 1, wherein said instruction memory stores a first sequence of instructions which implements a first digital signal processing function;

wherein said scan ahead means in said function preprocessor examines said first sequence of instructions stored in said instruction memory prior to operation of said instruction decoder in decoding said first sequence of instructions;

wherein said function preprocessor converts said first sequence of instructions in said instruction memory which implements said first digital signal processing function into a first digital signal processing function identifier;

wherein said means for disabling disables operation of said instruction decoder for said first sequence of instructions;

wherein said instruction decoder does not decode said first sequence of instructions.

3. The central processing unit of claim 2, wherein said one or more digital signal processing execution units perform said first digital signal processing function in response to said received first digital signal processing function identifier, wherein said first digital signal processing function is substantially equivalent to execution of said first sequence of instructions.

4. The central processing unit of claim 1, wherein said instruction memory stores a second sequence of instructions which does not implement a digital signal processing function;

wherein said scan ahead means in said function preprocessor examines said second sequence of instructions stored in said instruction memory prior to operation of said instruction decoder in decoding said second sequence of instructions;

wherein said function preprocessor determines that said second sequence of instructions in said instruction memory does not implement a digital signal processing function;

wherein said means for disabling does not disable operation of said instruction decoder for said second sequence of instructions; and wherein said instruction decoder decodes said second sequence of instructions.

5. The central processing unit of claim 4, wherein said one or more general purpose execution units execute said second sequence of instructions after operation of said instruction decoder.

6. The central processing unit of claim 1, wherein said one or more digital signal processing execution units provide data and timing signals to said one or more general purpose execution units.

7. The central processing unit of claim 1, wherein said function preprocessor generates a digital signal processing function identifier and one or more parameters in response to said determining means determining that said sequence of instructions in said instruction memory implements a digital signal processing function.

8. The central processing unit of claim 1, wherein said central processing unit is compatible with the X86 family of microprocessors.

9. The central processing unit of claim 1, wherein said one or more digital signal processing execution units are adapted for performing one or more mathematical operations from the group consisting of convolution, correlation, Fast Fourier Transforms, and inner product.

10. A method for executing instructions in a central processing unit (CPU), wherein the CPU includes one or more general purpose execution units and one or more digital signal processing execution units, the method comprising:

storing a plurality of instructions in an instruction memory for execution by the central processing unit, wherein said storing includes storing one or more sequences of instructions which implement a digital signal processing function;

examining a sequence of instructions stored in said instruction memory;

determining whether said sequence of instructions in said instruction memory implements a digital signal processing function;

converting said sequence of instructions in said instruction memory which implements a digital signal processing function into a digital signal processing function identifier, wherein said converting is performed if said determining determines that said sequence of instructions in said instruction memory implements a digital signal processing function;

transferring said digital signal processing function identifier to said one or more digital signal processing execution units, wherein said transferring occurs after said converting, wherein said transferring occurs if said determining determines that said sequence of instructions in said instruction memory implements a digital signal processing function;

performing a digital signal processing function after said transferring, wherein said performing said digital signal processing function occurs response to said received digital signal processing function identifier;

decoding said instructions comprising said sequence of instructions if said sequence of instructions in said instruction memory does not implement a digital signal processing function, wherein said decoding occurs after said examining said sequence of instructions, wherein said decoding said instructions comprising said sequence of instructions is only performed if said determining determines that said sequence of instructions does not implement a digital signal processing function; and disabling operation of said decoding said instructions comprising said sequence of instructions if said determining determines that said sequence of instructions in said instruction memory implements a digital signal processing function.

11. The method of claim 10, wherein said storing includes storing a first sequence of instructions which implements a first digital signal processing function;

wherein said examining examines said first sequence of instructions stored in said instruction memory prior to said decoding;

wherein said determining determines that said first sequence of instructions in said instruction memory implements a digital signal processing function wherein said converting converts said first sequence of instructions in said instruction memory which implements said first digital signal processing function into a first digital signal processing function identifier; and wherein said disabling disables operation of said decoding for said instructions comprising said first sequence of instructions in response to said determining that said first sequence of instructions in said instruction memory implements a digital signal processing function.

12. The method of claim 11, wherein said performing comprises performing said first digital signal processing function;

wherein said performing said first digital signal processing function is substantially equivalent to execution of said first sequence of instructions.

13. The method of claim 10, wherein said storing further comprises storing a second sequence of instructions which does not implement a digital signal processing function;

wherein said examining examines said second sequence of instructions stored in said instruction memory prior to operation of said decoding;

wherein said determining determines that said second sequence of instructions in said instruction memory does not implement a digital signal processing function;

wherein said disabling does not disable operation of decoding for said second sequence of instructions; and wherein said decoding decodes said instructions comprising said second sequence of instructions in response to said determining that said sequence of instructions in said instruction memory does not implement a digital signal processing function.

14. The method of claim 13, further comprising:

executing said second sequence of instructions after said decoding said instructions comprising said second sequence of instructions.

15. The method of claim 10, wherein said converting generates a digital signal processing function identifier and one or more parameters in response to said determining that said sequence of instructions in said instruction memory implements a digital signal processing function.

16. The method of claim 10, wherein said central processing unit is compatible with the X86 family of microprocessors.

17. The method of claim 10, wherein said performing said digital signal processing function performs one or more mathematical operations from the group consisting of convolution, correlation, Fast Fourier Transforms, and inner product.

* * * * *